United States Patent [19]

Wunder

[11] Patent Number: 4,667,587

[45] Date of Patent: May 26, 1987

[54] ELECTRIC COFFEE MAKER WITH ANTI-DRIP VALVE ON BOTTOM OF FILTER

[75] Inventor: Dieter Wunder, Reichelsheim, Fed. Rep. of Germany

[73] Assignee: Braun Aktiengesellschaft, Kronberg, Fed. Rep. of Germany

[21] Appl. No.: 729,325

[22] Filed: May 1, 1985

[30] Foreign Application Priority Data

May 3, 1984 [DE] Fed. Rep. of Germany ....... 3416403

[51] Int. Cl.⁴ ............................................. A47J 31/24
[52] U.S. Cl. ........................................ 99/295; 99/299; 141/335; 141/351; 141/373
[58] Field of Search ................. 99/299, 295, 306, 280, 99/300, 304, 305; 141/335, 351, 373; 426/433

[56] References Cited

U.S. PATENT DOCUMENTS

| | | | |
|---|---|---|---|
| 2,951,431 | 9/1960 | Hugentobler | 99/299 |
| 3,034,418 | 5/1962 | Bunn | 141/335 |
| 3,187,663 | 6/1965 | McLean | 99/299 |
| 4,343,232 | 8/1982 | Corbier | 99/299 |
| 4,467,707 | 8/1984 | Amiot | 99/299 |

FOREIGN PATENT DOCUMENTS

| | | |
|---|---|---|
| 1970143 | 10/1967 | Fed. Rep. of Germany . |
| 7436286 | 7/1975 | Fed. Rep. of Germany . |
| 2538685 | 8/1975 | Fed. Rep. of Germany . |
| 2605957 | 2/1976 | Fed. Rep. of Germany . |

Primary Examiner—Robert W. Jenkins

[57] ABSTRACT

Electric coffeemaker with anti-drip valve disposed at the outflow opening of its filter funnel, said valve being actuated in a functionally correct manner by a lever system.

28 Claims, 9 Drawing Figures

ELECTRIC COFFEE MAKER WITH ANTI-DRIP VALVE ON BOTTOM OF FILTER

The invention relates to an electric coffeemaker with an anti-drip valve at the outflow opening of its filter funnel. Anti-drip valves of this type are designed to prevent coffee continuing to flow out of the coffee filter when the carafe is removed after the brewing process or the filter funnel is removed by swinging, lifting, or pulling it out of the coffeemaker, said funnel containing the ground coffee saturated with brewing water.

A number of coffeemakers with such anti-drip valves are known, having in common the feature that the valve is actuated by means of a sensing element which is deflected from its resting position by the lid of the carafe, when it is in its normal position, opening the valve. Typical actuating systems of this type are described and shown for example in German Pat. No. 25 38 685, German Utility Model No. 19 70 143, German AS No. 26 05 957, and German Utility Model No. 74 36 286. They all suffer from the disadvantage that they can achieve their goal of precise valve actuation only if a corresponding set of instructions for use is followed exactly, in other words, for example, when the carafe is removed from or replaced on the coffeemaker in a very specific direction and with a very specific orientation. In particular, this results in general in a slight awkwardness, namely that the sensing mechanism is deflected by the edge of the lid and the valve opens just as the carafe is being placed under the filter funnel or is only partially in this position. In addition the functional safety of the known devices is critically dependent on all of the dimensional tolerances both in the actuating system and in the coffeemaker housing, as well as the carafe and the shape of its lid, being maintained precisely, something which is not without its problems in the manufacture and assembly of the individual parts and often causes insuperable difficulties under wear conditions when spare parts are employed.

The goal of the present invention is to overcome all these difficulties and to create a coffeemaker with a drip-proof filter funnel which not only allows for considerable measurement tolerances in the cooperating parts of the mechanism, but is also operable in a completely foolproof manner, in other words requires no restrictive operating instructions.

In accordance with the invention, there is provided a coffeemaker with an anti-drip valve that is operated by a double lever linkage. This system has the advantage that the anti-drip valve can only open when two conditions are satisfied, namely, both the filter funnel and the carafe must be at least approximately in their specified working positions in order for the sensing lever according to the invention to cooperate with the activating lever according to the invention to open the anti-drip valve. Preferably, the so-called activating lever is brought into its working position by the filter funnel being inserted or swung into its working position. This is accomplished in particular by the filter funnel abutting a wall of the coffeemaker housing as it is inserted or swung into its working position, that the activating lever is deflected into its working position by parts of this wall. Preferably an up ramp is provided for this purpose on an appropriate point on the housing wall, on which ramp the activating lever rests only when the filter funnel has nearly reached its end position, and from which (ramp) is immediately lifts off as soon as the filter funnel is removed however slightly from its normal position. Preferably, the sensing lever is activated in such fashion that it is swung from a resting position in which it is not reachable by the lid of the carafe under any circumstances, into a sensing position by the activating lever, in which position the lid of the carafe can contact it to open the anti-drip valve as soon as the carafe has nearly reached its normal position. It is especially advantageous in this connection for the lever geometry to be selected so that the sensing lever, brought into and held in the sensing position by the deflection of the activating lever, is swung back into its resting position by the lid of the carafe, thereby opening the anti-drip valve as it swings back.

In an especially advantageous embodiment of the invention, the sensing lever is in its resting position, and the resting position of the activating lever, above the lower edge of the housing of the filter funnel, and is swung out into the space beneath this lower edge of the housing when the activating lever is deflected. This makes it possible to remove the filter funnel from the coffeemaker and to set it aside with the lower edge of its housing on a supporting surface, for example on a table top, without the sensing lever being deflected by the supporting surface and opening the anti-drip valve.

Especially favorable prerequisites regarding lever geometry, space requirements, and manufacturing cost can be achieved in the lever system according to the invention by having the deflection of the sensing lever and the activating lever takes place in the same operating plane running radially to the vertical filter axis, and also by virtue of the fact that the sensing lever, activating lever, and closing element of the anti-drip valve are so articulated with one another that the same spring element, engaging one of the two levers, pushes or pulls both levers into their resting positions and the sealing element into its closed position.

The up ramp which deflects the activating lever is preferably so mounted and designed that the activating lever rests on it as the filter funnel is inserted or swung in, as soon as the filter funnel has come within a maximum of 3 cm and a minimum of 1 cm of its working position. It has been found that when this spacing range is maintained, the remaining insertion or swinging travel of the filter funnel is sufficient fully to deflect the activating lever and thus activate the sensing lever into its sensing position by deflection. On the other hand, this ensures that the filter funnel is already sufficiently exactly positioned above the carafe when the sensing lever is deflected against the lid of the carafe, thus opening the anti-drip valve. Preferably the outer end of the sensing lever, deflected by the activating lever, is contacted by the circumferential edge of the carafe lid as soon as the radial distance of the carafe from its normal position falls below a value of a maximum of 5 cm and a minimum of 0.5 cm.

Another preferred embodiment of the invention is characterized by the fact that the articulation axis, by which the activating lever and the sensing lever are connected operationally, is mounted in a elongated hole which receives the displacements of this axis which occur as a result of the lever geometry. To achieve a high deflection travel of the sensing lever, which renders the valve actuating system according to the invention largely insensitive to variations in tolerances in the dimensions of the cooperating parts, the effective pivot axis of the sensing lever, in order for the latter to be deflected by the activating lever, is at least four times as far away from the outer end of the sensing lever as the articulation axis with which the activating lever engages the sensing lever.

Further advantageous embodiments, modifications, and designs of the basic principle according to the invention will be apparent from the attached drawing, wherein.

Figure 1:
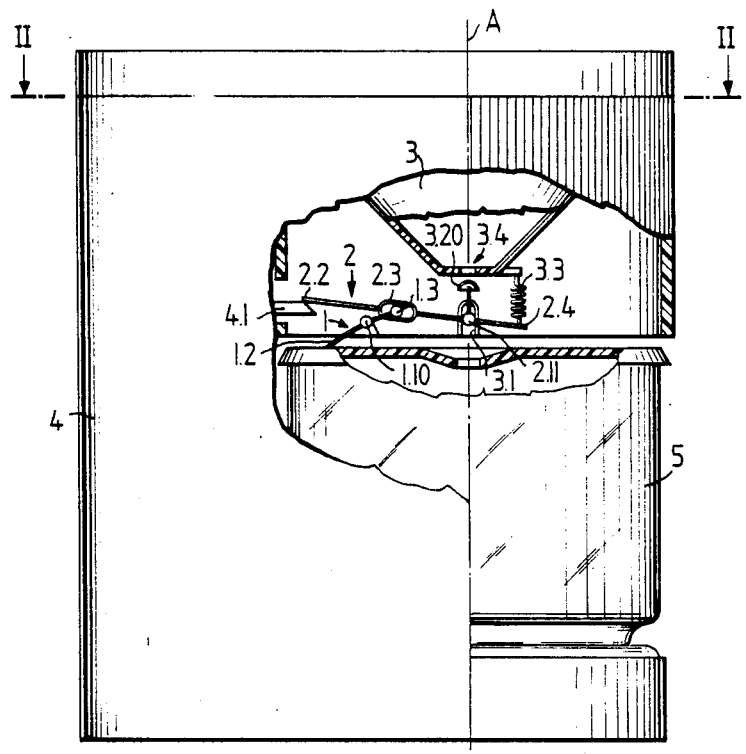
FIG. 1 is a side elevation, partially cut away, of a preferred embodiment of the coffeemaker according to the invention, whereby the individual parts essential to the invention are shown partially schematically for improved visibility.
Figure 2:
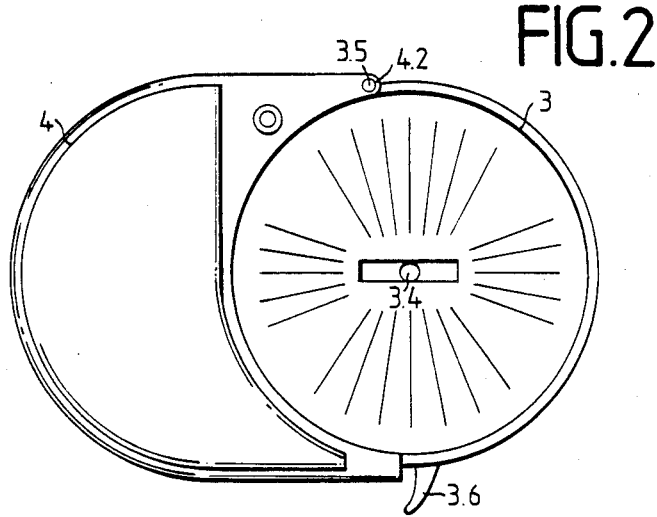
FIG. 2 is a section through the coffeemaker according to FIG. 1 along line II—II.

As is evident from FIGS. 1 and 2, the coffeemaker according to the invention consists of a housing 4 in which the usual parts such as water tank, through-flow heater, warming plate, cold water drop tube between the water tank and the through-flow heater, and the brewing water rise tube from the through-flow heater to the filter funnel are shown, as well as the removable filter funnel 3 and coffee carafe 5. The double lever system according to the invention which serves to actuate valve sealing element 3.20 is located beneath anti-drip valve 3.4 in filter funnel 3. This system consists primarily of sensing lever 1 and activating lever 2, which in the position shown has its outer end 2.2 deflected by up ramp 4.1 on the wall of housing 4 and which, by its deflection, has rotated sensing lever 1, coupled to it by elongated hole 2.3 and articulation axis 1.3, about its axis 1.10 which is integral with the filter, so that its outer end 1.2 is in contact with the edge of the carafe lid and abuts the latter.

The cooperation of the deflections of sensing lever 1 and activating lever 2 causes the horizontal axis 2.11 of activating lever 2, which is vertically movable in guide 3.1 which is vertical and integral with the filter, to be displaced downward against the force of spring element 3.3 which engages inner end 2.4 of the activating lever and is articulated at the other end on filter funnel 3. In this way, sealing element 3.20, which is articulated in the vicinity of axis 2.11, preferably flexibly, to activating lever 2, is pulled downward away from the opening of anti-drip valve 3.4 and assumes its open position, shown in FIG. 1.

If the situation shown in FIG. 1 is modified by removing carafe 5, spring element 3.3 causes the outer end 1.2 of the sensing lever simultaneously to fold downward and axis 2.11 together with closing element 3.20 of move upward, so that the latter seals anti-drip valve 3.4. If the situation shown is modified, on the other hand, by removing filter funnel 3, the outer end 2.2 of activating lever 2 slides downward from up ramp 4.1, and spring element 3.3 pivots activating lever 2 about its articulation axis 1.3, so that in this case also the vertically movable axis 2.11 moves upward in vertical guide 3.1 in the same manner as sealing element 3.20 and anti-drip valve 3.4 is closed. It is readily apparent from FIG. 1 that even a slight horizontal displacement of carafe 5 or of filter funnel 3 is sufficient to cause sensing lever 1 to slide off the edge of the carafe or activating lever 2 to slide off the up ramp, immediately causing closure of the anti-drip valve.

Figure 3A:
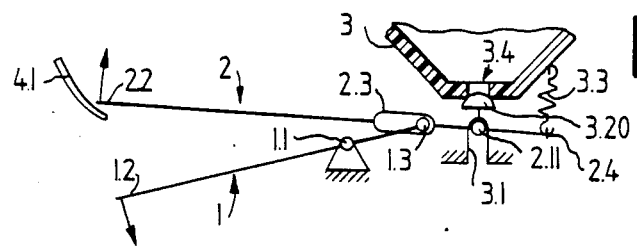
FIGS. 3a to 3g show preferred lever systems according to the present invention and show schematically, always in the nonactivated state, i.e. with the anti-drip valve closed, how particular embodiments of the invention can be implemented advantageously (the system shown in FIG. 3a is identical to the arrangement shown in FIG. 1).
Figure 3B:
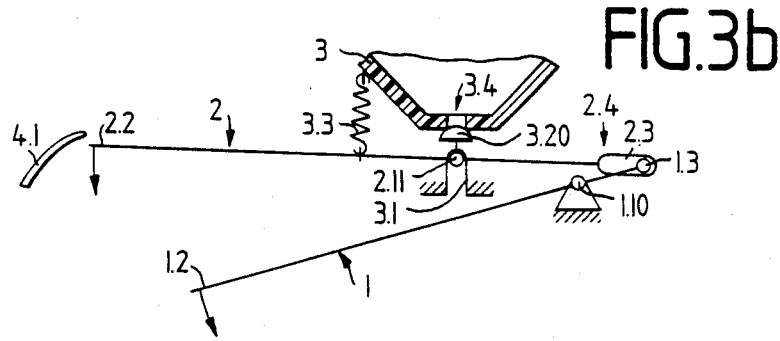
Figure 3C:
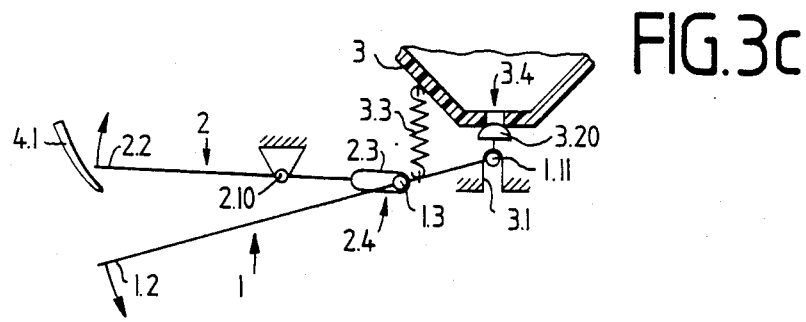
Figure 3D:
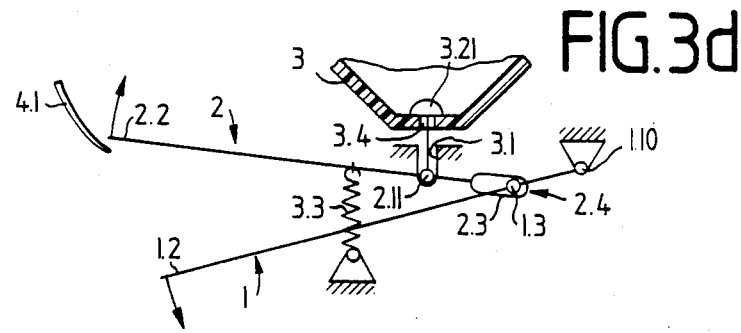
Figure 3E:
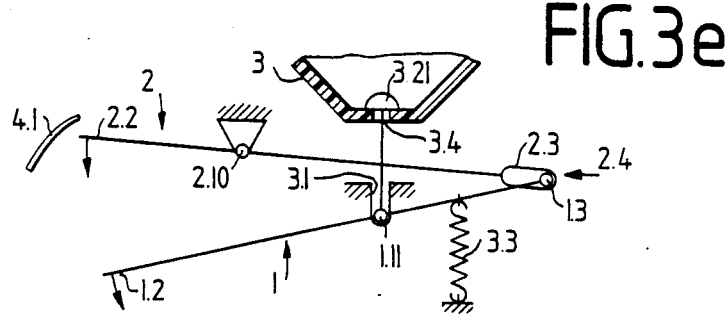
Figure 3F:
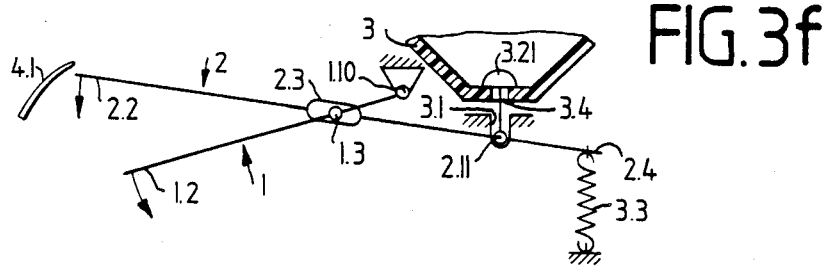
Figure 3G:
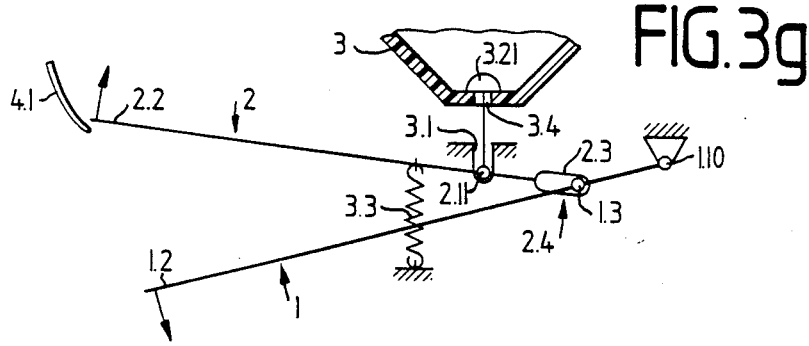

In addition to the especially advantageous two-lever system described above, which is shown once again in FIG. 3a in its resting position, a number of equally advantageous embodiments is possible within the framework of the present invention of which the most advantageous are shown in FIGS. 3b to 3g, always in their resting position. They differ individually especially in that activating lever 2 can be deflected downward instead of upward by up ramp 4.1 and also by the fact that instead of sealing element 3.20 which seals anti-drip valve 3.4 from below, a sealing element 3.21, which seals from above, can also be used, and differs in the lever geometry, i.e. the arrangement of the vertically displaceable pivot bearing integral with the filter, the elongated-hole articulation of the two levers, and the point of application of spring element 3.3 relative to filter axis A which is vertical and defined by anti-drip valve 3.4. In each case, deflection of activating lever 2 causes sensing lever 1 to be deflected downward.

The support bearing, which is preferably provided as a closure for vertical guide 3.1 of vertically movable axes 1.11 and 2.11, and is open at the top or bottom, may be positioned so that axes 1.11 and 2.11 abut it precisely when sealing elements 3.20 and 3.21 of anti-drip valve 3.4 have reached their sealing positions.

In all embodiments, up ramp 4.1 preferably has a locking notch into which the outer end 2.2 of activating lever 2 engages in sliding fashion at its highest deflection, i.e. when the filter funnel reaches its normal position the correctly designed lever geometry of the two-lever system according to the invention gives this latching action additional reinforcement precisely in the state in which it is important, namely when the carafe which has been inserted in the coffeemaker beneath the filter funnel is to be removed; the sensing lever deflected by the top of the carafe pushes activating lever 2 in the direction of up ramp 4.1, therefore reinforcing its application pressure in the latch for precisely the period of time required for the adhesive friction of the sensing lever on the top of the carafe to change to reduced sliding friction as the carafe is removed, therefore eliminating any danger that the filter-funnel will be pulled out when the carafe is removed.

Preferably, the removable filter funnel according to the present invention is designed as a so-called swing filter, which can be swung out of the coffeemaker housing by pivoting about a vertical pivot axis mounted at its periphery. In an especially advantageous embodiment, this pivot axis is provided by two axle stubs 3.5 disposed one above the other, cooperating with bearing eyes 4.2 and facilitating easy mounting and removal of filter funnel 3. The preferred embodiments of these pivot bearings, considerably facilitate the handling of the filter funnel during removal and replacement, and the especially efficient manner in which it can be manufactured.

I claim:

1. An electric coffeemaker comprising
a housing having structure defining a carafe receiving region and support structure above said carafe receiving region,
filter funnel structure for releasable engagement with said support structure,
said filter funnel structure having an outlet and an anti-drip valve disposed in said outlet, said anti-drip valve being movable between closed and opened positions, a valve operating mechanism including biasing means for biasing said valve to its closed position closing said filter funnel outlet, and double lever linkage connected between said biasing means and said valve for moving said valve to its open position, said double lever linkage including activating and sensing levers that are coupled together, said activating lever being deflectable from a resting position to a working position when said filter funnel structure is in engagement with said support structure, and said sensing lever being deflectable by disposition of a coffee carafe in said carafe receiving region in alignment with and below said filter funnel outlet, said linkage being arranged so that said activating lever must be deflected from its resting position to its working position before said sensing lever can be deflected by said carafe to open said anit-drip valve.

2. Coffeemaker according to claim 1, wherein said activating lever is being deflectable into its working position by the insertion or swinging of filter funnel into its working position.

3. Coffeemaker according to claim 2, wherein said filter funnel abuts a wall of said housing as it is slid or swung into its working position such that said activating lever is deflected into its working position by parts of this wall.

4. Coffeemaker according to claim 3, wherein said housing wall has a ramp to deflect said activating lever.

5. Coffeemaker according to claim 1 wherein said sensing lever is deflectable into its sensing position by deflection of said activating lever, in which position, and only in which position, said sensing lever is contactable by said carafe to open said anti-drip valve.

6. Coffeemaker according to claim 5, wherein said sensing lever extends in its resting position and in the resting position of said activating lever above the lower edge of the housing of filter funnel and is deflectable into the space below the lower edge of the filter funnel housing by the deflection of said activating lever.

7. Coffeemaker according to claim 5 wherein said sensing lever is brought into and held in its sensing position by deflection of said activating lever and is swingable back in the direction of its resting position by said carafe, whereby its return swing causes said anti-drip valve to open.

8. Coffeemaker according to one of claims 1 to 7, and further including a spring element and wherein said sensing and activating levers and said anti-drip valve are so articulated together such that said spring element moves both levers into their resting positions and closes said anti-drip valve.

9. Coffeemaker according to one of claims 1 to 7 wherein said sensing and activating levers are in a cooperative relationship with one another via an articulation axis mounted in an elongated hole.

10. Coffeemaker according to one of claims 1 to 7 wherein said valve is flexibly coupled to said double lever linkage.

11. Coffeemaker according to claim 1 wherein said sensing and activating levers are pivotable in the same active plane running to vertical filter axis (A).

12. Coffeemaker according to claim 1 wherein the outer end of said activating lever, in its resting position, engages ramp structure when said filter funnel is inserted or swung into position, as soon as the filter funnel has come within a maximum of 3 cm and a minimum of 1 cm of its working position.

13. Coffeemaker according to claim 10 wherein said up ramp structure comprising a latch for the outer end of said activating lever, into which the latter engages by sliding action when said activiting lever reaches its working position.

14. Coffeemaker according to claim 1 wherein the outer end of said sensing lever, deflected by said activating lever, is tensionable by a circumferential edge of said carafe as soon as the radial distance of the carafe from its normal position falls below a value of a maximum of 5 cm and a minimum of 0.5 cm.

15. Coffeemaker according to claim 1 wherein the deflection of said sensing lever is effected by said activating lever about a pivot axis from which the outer end of said sensing lever is at a distance which is at least four times as great as the articulation axis of said activating lever.

16. Coffeemaker according to claim 1 wherein said activating lever extends—preferably approximately at the level of said anti-drip valve—from its outer end radially to filter axis (A), and has its inner end beyond the latter; vertically below said anti-drip valve it has a horizontal pivot axis which is biased upward by a spring element which extends between the inner end of said activating lever and said filter funnel, said horizontal pivot axis being disposed in a vertical guide integral with said filter funnel structure;

said sensing lever has a horizontal pivot axis mounted integral with said filter funnel structure;

the inner end of said sensing lever being articulated by a horizontal axis guided in an elongated hole on said activating lever between its outer end and its pivot axis;

said anti-drip valve being attached to said activating lever in the vicinity of the pivot axis of said activating lever; and ramp structure for deflecting the outer end of said activating lever upward.

17. Coffeemaker according to claim 1 wherein said activating lever extends, preferably at the lever of said anti-drip valve, from its outer end radially to filter axis (A) and has its inner end beyond the latter; vertically below said anti-drip valve it has a horizontal pivot axis which is biased upward by a spring, which is connected to said activating lever between said pivot axis and said outer lever end, and to horizontal pivot axis being disposed in a vertical guide which is integral with said filter funnel structure;

said sensing lever has a horizontal pivot axis mounted integral with said filter funnel structure;

the inner end of said sensing lever being articulated to the inner end of said activating lever via a horizontal axis guided in an elongated hole;

said anti-drip valve being fastened to said activating lever in the vicinity of the pivot axis of said activating lever;

and ramp structure for deflecting the outer end of said activating lever downward.

18. Coffeemaker according to claim 1 wherein said activating lever has a horizontal pivot axis mounted integrally with said filter funnel structure and extending, preferably at the approximate level of said anti-drip valve, from its outer end radially to filter axis (A);

said sensing lever is movably mounted at its inner end by a horizontal axis in a vertical guide which is integral with said filter funnel structure beneath said anti-drip valve;

the inner end of said activating lever being articulated to said sensing lever by a shaft guided in an elongated hole, and said sensing lever being tensioned in the direction of its resting position by a spring element which engages between this articulation and its pivot axis and is mounted at the other end integral with the filter; which seals from below being fastened to said sensing lever in the vicinity of the pivot axis of said sensing lever; and ramp structure for deflecting the outer end of said activating lever upward.

19. Coffeemaker according to claim 1 wherein said activating lever extends, preferably approximately at the height of said anti-drip valve, from its outer end radially to filter axis (A), and with its inner end beyond the latter; vertically below said anti-drip valve it has a horizontal pivot axis which is biased downward, by a spring element which is connected to said activating lever between said pivot axis and the outer lever end and to said filter funnel structure at the other end, said horizontal pivot axis being disposed in a vertical guide which is integral with said filter funnel structure;

said sensing lever is articulated at its inner end with a horizontal pivot axis mounted integrally with said filter funnel structure;

the inner end of said activating lever being articulated by an axis guided in an elongated hole between said pivot axis and the outer end of said sensing lever;

said anti-drip valve being fastened in the vicinity of the pivot axis of said activating lever to said activating lever;

and ramp structure for deflecting the outer end of said activating lever upward.

20. Coffeemaker according to claim 1 wherein said activating lever has a horizontal pivot axis mounted integrally with the said filter funnel structure and preferably extending approximately at the level of said anti-drip valve, radially to filter axis (A) from its outer end;

the inner end of said activating lever being articulated to the inner end of said sensing lever by means of a shaft guided in an elongated hole;

said sensing lever being movably mounted by means of an axis which is horizontal and located between its inner end and its outer end, in a vertical guide which is mounted integrally with the filter and vertically below anti-drip valve integral with said filter funnel structure; said sensing lever being biased by a spring element connected between the inner end of said sensing lever and the axis on sensing lever, and is supported at the other end integrally with the filter, said sensing lever being tensioned in the direction of its resting position; said anti-drip valve being fastened to said sensing lever in the vicinity of the pivot axis of said sensing lever; and ramp structure for deflecting the outer end of said activating lever downward.

21. Coffeemaker according to claim 1 wherein said activating lever extends, preferably approximately at the level of anti-drip valve, from its outer end radially to filter axis (A) and has its inner end extending beyond the latter; vertically below said anti-drip valve it has a horizontal pivot axis, which is pressed downward by means of a spring element, engaging the inner lever end of said activating lever and abutting said filter funnel structure at the other end, in a vertical guide integral with said filter funnel structure;

said sensing lever is a one-armed lever with a horizontal pivot axis which is mounted integrally with the filter;

said activating lever is articulated between its outer end and its pivot bearing by means of a shaft guided in an elongated hole on said sensing lever between its pivot axis and its outer end;

said anti-drip valve sealing from above and being fastened to said activating lever in the vicinity of the pivot axis of said activating lever;

and ramp structure for deflecting the outer end of said activating lever downward.

22. Coffeemaker according to claim 1 wherein said activating lever extends, preferably approximately at the level of said anti-drip valve from its outer end radially to filter axis (A) and with its inner end above the latter; vertically below said anti-drip valve it has a horizontal pivot axis, which is pressed downward by means of a spring element engaging between said pivot axis and the outer end of said activating lever and abutting said filter funnel structure at the other end, in a vertical guide integral with said filter funnel structure;

said sensing lever is a one-armed lever with a horizontal pivot axis integral with said filter funnel structure;

said activating lever is articulated at its inner end by means of a shaft guided in an elongated hole on said sensing lever between its pivot axis and its outer end;

said anti-drip valve is fastened in the vicinity of the pivot axis of said activating lever to said activating lever; and ramp structure for deflecting the outer end of said activating lever upward.

23. Coffeemaker according to claim 1 wherein said filter funnel structure is pivotable about a vertical axis at its periphery and at the outside wall of said coffeemaker housing by two pivot bearings, located vertically one above the other, each consisting of a axle stub and a bearing eye.

24. Coffeemaker according to claim 23 wherein said filter funnel structure is releasably mounted on said pivot bearings.

25. Coffeemaker according to claim 24, wherein one of said pivot bearings has both a radially guiding and axially supporting function, while the other merely has a radially guiding effect.

26. Coffeemaker according to claim 23 wherein the two axle stubs have different lengths.

27. Coffeemaker according to claim 26, wherein the axle stub of one pivot bearing is directed downward and the axle stub of the other pivot bearing is directed upward, the distance between the bases of the axle stubs different from the spacing of the bearing eyes by more than the length of the shorter axle stub and by less than the length of the longer axle stub.

28. Coffeemaker according to claim 23 wherein the axle stubs and the bearing eyes are formed on said filter funnel structure and/or said coffeemaker housing.

* * * * *

UNITED STATES PATENT AND TRADEMARK OFFICE
CERTIFICATE OF CORRECTION

PATENT NO. : 4,667,587
DATED : May 26, 1987
INVENTOR(S) : Dieter Wunder

It is certified that error appears in the above-identified patent and that said Letters Patent are hereby corrected as shown below:

Col. 1, line 68, "is" should be --it--;
Col. 3, line 56, "of" should be --to--.

Claim 17, line 49, after "to", insert --said filter funnel structure at the other end, said--.

Claim 18, line 17, after "filter;" insert --said anti-drip valve--.

Claim 27, line 59, "different" should be --differing--.

Signed and Sealed this

Third Day of November, 1987

Attest:

DONALD J. QUIGG

Attesting Officer

Commissioner of Patents and Trademarks